April 2, 1929.  E. S. SMAIL  1,707,418
FURNACE FOR WATER TUBE STEAM BOILERS
Filed Feb. 8, 1927  2 Sheets-Sheet 1
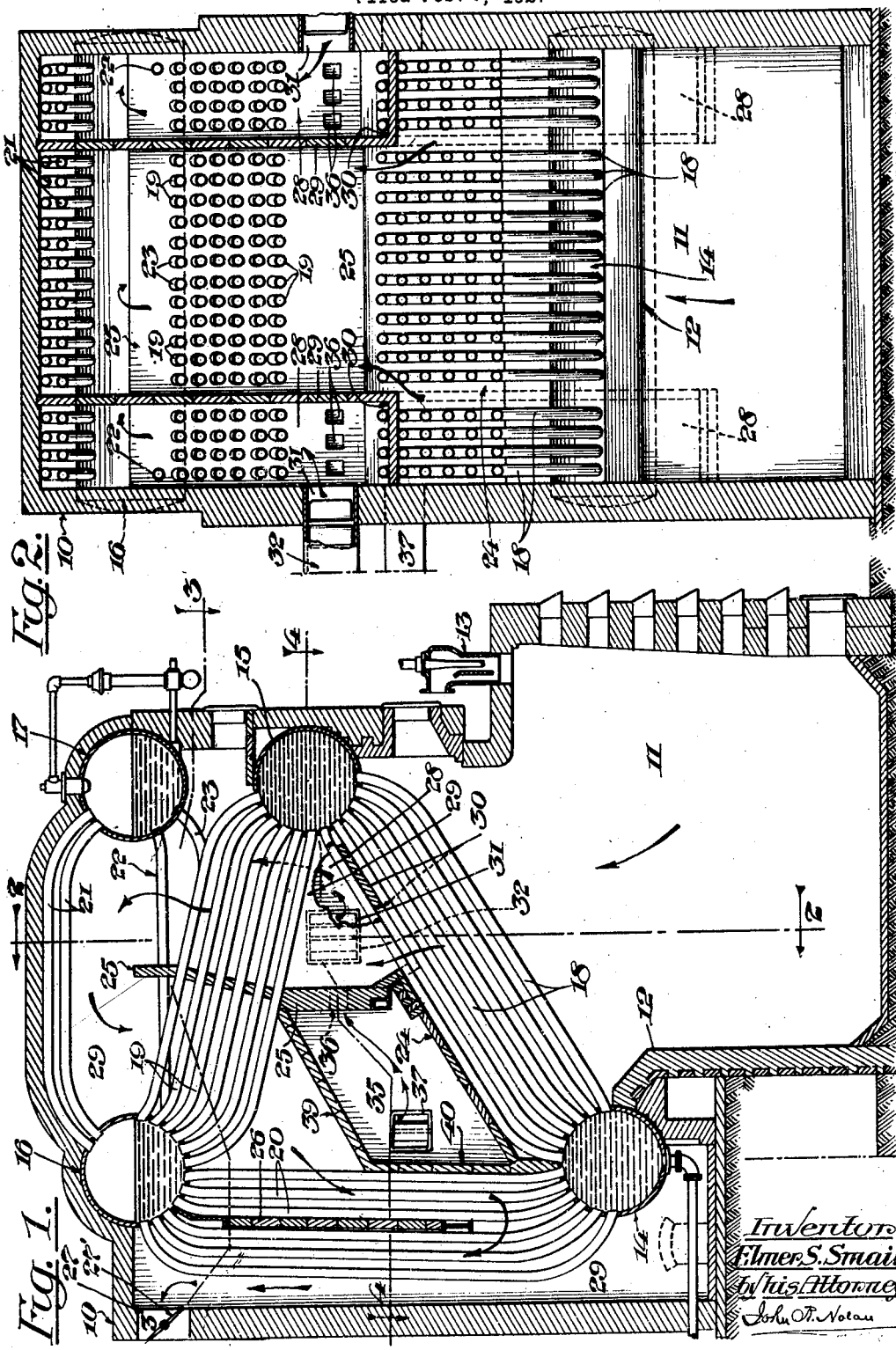

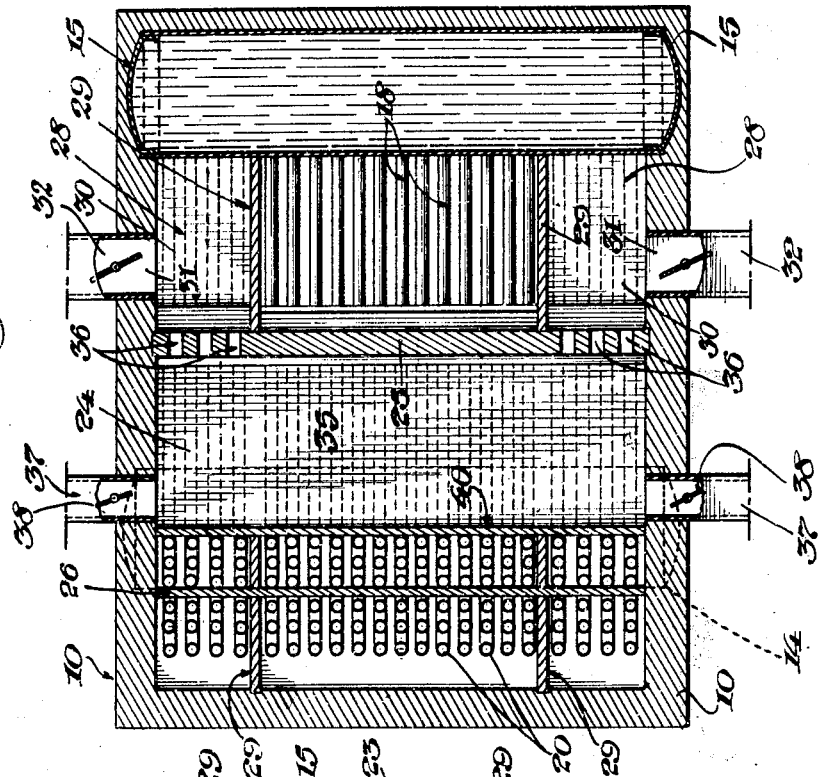

Patented Apr. 2, 1929.

1,707,418

UNITED STATES PATENT OFFICE.

ELMER S. SMAIL, OF OAK PARK, ILLINOIS, ASSIGNOR, BY MESNE ASSIGNMENTS, TO KIDWELL-GRAVER CORPORATION, A CORPORATION OF DELAWARE.

FURNACE FOR WATER-TUBE STEAM BOILERS.

Application filed February 8, 1927. Serial No. 166,649.

This invention relates to furnaces for water-tube steam boilers, and its object is the provision of a construction whereby the waste heat gases from cement kilns, or other suitable sources, are utilized in conjunction with the primary fuel of a furnace, for the efficient generation of steam.

According to my invention means are provided whereby waste heat gases are isolated from the primary fuel gases and are caused to flow in parallel or substantially parallel paths therewith throughout the length of, and in contact with the heating surface of the boiler; means are provided whereby preheated air may be supplied in an efficient manner to the waste heat gases, and means are provided whereby independent draft control of the respective gases can be effected, all of which will be hereinafter described and the novel features then be defined in the appended claims.

In the drawings—

Figure 1 is a longitudinal vertical section of a steam-boiler furnace construction embodying the principle of my invention.

Fig. 2 is a transverse vertical section of the apparatus, as on the line 2—2 of Fig. 1.

Figs. 3 and 4 are transverse horizontal sections, as on the lines 3—3 and 4—4, respectively, of Fig. 1.

Referring to the drawings, 10 designates a boiler setting; 11 a combustion chamber therein, and 12 a bridge wall at the rear of said chamber. This chamber may be adapted and arranged to burn solid, liquid or gaseous fuel, as desired. In the present instance the chamber is designed for use in connection with a powdered coal burner, as indicated at 13. This chamber may be provided with water screens and air or water protected walls.

The boiler proper herein illustrated is of the multiple drum and tubular bank type wherein spaced-apart transversely-arranged drums are associated with banks of water tubes, that is to say, the mud drum 14 is located at the rear of the bridge wall; the water drum 15 is located at the forward wall of the setting and below the normal level of the boiler water, and the two steam-and-water drums 16, 17 are arranged at the top of the setting and over the drums 14, 15, respectively. The banks of water tubes 18, 19, 20 connect the drums 14, 15, 16 in succeeding order, thus providing a continuous circulation path for the water. The steam spaces of the drums 16, 17 are connected by cross-over or superheating tubes 21, and the water-spaces of these drums are connected by complementary flow tubes 22, 23 which constitute a supplemental water path effective to maintain a constant level of water in the drum 17.

The boiler space within the setting is provided with suitably-disposed baffling comprising, in the present instance, a baffle member 24 which overlies the rearward portion of the lowermost tube bank 18 and extends forwardly from the mud drum 14 a substantial distance; a baffle member 25 which rises from the forward end of the member 24 to a height somewhat above the tube bank 19, and a baffle member 26 which depends from the rear steam-and-water drum so as partially to divide the rear tube bank, as usual. Thus the lowermost tube bank is exposed to the radiant heat from the combustion chamber throughout the width of the boiler space, and a succession of heat passes from the forward portion of the combustion chamber to the rear of the boiler space is provided for the hot products of combustion from the fuel, which products finally escape through a suitably-disposed outlet 27 in the rear wall of the setting. This outlet is provided with a damper 27', or other suitable draft controlling device.

According to the preferred form of my invention, the hot gases and products of combustion, after they leave the combustion chamber, are caused to flow in a path centrally of the boiler by the provision within the setting of two laterally-disposed supplemental chambers 28 which confine the groups of side tubes of the respective banks 19, 20 and also the adjacent ends of the drums and baffling. These chambers overlie in whole or in part the lower bank of tubes 18 and extend from front end to rear end of the boiler structure, and the ends of the baffles provide in each chamber a succession of heat passes parallel with but separated from the adjacent passes for the primary gases. Each chamber includes a vertically-disposed wall 29 spaced from the adjacent side wall of the boiler setting and having an inclined floor portion 30 supported in close relation to the lower bank of tubes 18 and in the space between the base of the vertical baffle 25 and the forward water drum 15. In the present instance the chamber includes within it some of the upper rows of tubes of the bank 18, but if desired the floor portion may be supported on or well below the top of the bank, the only limiting feature being the necessity of having below the floor portion sufficient tubes adequately to absorb the radiant heat from the primary combustion chamber.

In the side walls of the setting, above the floor 30 and forward of the baffle 25, are openings 31 through which waste heat gases are delivered in the chambers 28 by conduits 32 extending from the discharge flue of a cement kiln or other suitable source of waste heat gases; and in the rear wall of the setting are appropriate outlets 33 for the final escape of the waste heat gases from the respective side chambers. The outlets 33 are fitted with dampers 34 or other suitable draft controlling devices, operative independently of the damper 27'.

Means are provided whereby heated air may, if necessary or desirable, be supplied to the waste heat gases where they enter the forward portions of the respective side chambers 28, which means, in the present instance, comprises a transverse trunk 35 extending between the side walls of the setting and communicating with the respective chambers 28 through suitably-located air ports 36 formed in the baffle 25, the walls of the setting having appropriate air inlets 37 leading to the interior of the trunk. These inlets are preferably provided with dampers 38. In the present instance the baffle members 24, 25 constitute the bottom and front wall of the air trunk, the remaining walls being formed by top and back members 39, 40, respectively, extending throughout the width of the furnace and being included in the baffling. Hence the walls of the air trunk are efficiently exposed to the action of the boiler heat, including the fuel and waste heat gases.

From the foregoing described construction exemplifying my invention, it will be seen that waste heat gases introduced in the side chambers 28 by the conduits 32, are isolated from but follow a course of travel parallel to that of the primary fuel gases from the front to the rear of the boiler. If these waste heat gases possess inflammable properties, air can be readily introduced thereto from the trunk 35 through the air ports 36, which air, being preheated in the trunk, will promote the combustion of gases of low combustion value.

The separation of the waste heat gases from the combustion products of the primary fuel as hereinbefore described prevents a variation in the furnace temperature and consequent variation in furnace efficiency which would result from the mixing of the waste heat gases and the combustion products of the primary fuel, as the former may be below the desired furnace temperature and may be variable in temperature, composition and quantity. Moreover, such separation localizes the deposition on the boiler tubes of incombustible dust that may be carried over with the waste gases, thus enabling the ready cleaning of the boiler tubes; and, again, since the waste gases in many cases may have a corrosive effect on the ordinary boiler metals the isolation of these gases enables the limitation of special corrosion resisting materials to the exposed parts only. In addition, the described separation of the waste heat and primary heat gases and their discharge through separate outlets, permits independent draft control of the respective sources of heat, thus enabling a constant boiler output to be maintained by means of appropriate adjustment of primary fuel and air supply, irrespective of the temperature, composition, or quantity of the waste heat gases available.

While my invention has been designed primarily for use in connection with the type of water-tube boiler herein illustrated, it is not to be closely limited thereto, nor is my invention to be limited to the specific construction and arrangement of co-operating elements herein disclosed as the same may be modified within the principle of the invention and the scope of the appended claims.

I claim—

1. A boiler comprising a setting, drums in the setting, banks of tubes connecting the drums, a combustion chamber for primary fuel in the setting, an outlet from the setting, there being a passage for the products of combustion extending from the combustion chamber to the outlet, some of the tubes of some of said banks throughout their entire length being within said passage, a second passage within the setting separate from the first passage, some of the tubes of some of the banks throughout their entire length being within the second passage, an outlet from the second passage, and means for supplying waste heat gases from an independent source to said second passage.

2. A boiler comprising a setting, a mud drum, a water drum and a steam and water drum in the setting, a bank of tubes connecting the mud drum to the water drum, a bank of tubes connecting the mud drum to the steam and water drum, a bank of tubes connecting the water drum to the steam and water drum, a combustion chamber for primary fuel in the setting below the bank of tubes connecting the mud drum to the water drum, baffles within the setting forming a circuitous pass for the gases from the combustion chamber to an outlet from the setting, some of the tubes of the banks connecting the water drum to the steam and water drum and the bank of tubes connecting the mud drum to the steam and water drum being within said passage throughout their entire length, a second passage within the setting separate from the first passage, some of the tubes of the bank connecting the water drum to the steam and water drum and the bank connecting the mud drum to the steam and water drum being in the second passage throughout their entire length, an outlet from the second passage, and means for supplying waste heat gases from an independent source to said second passage.

3. A boiler comprising a setting, a mud drum, a water drum and a steam and water drum in the setting, a bank of tubes connecting the mud drum to the water drum, a bank of tubes connecting the mud drum to the steam and water drum, a bank of tubes connecting the water drum to the steam and water drum, a combustion chamber for primary fuel in the setting below the bank of tubes connecting the mud drum to the water drum, baffles within the setting forming a circuitous pass for the gases from the combustion chamber to an outlet from the setting, some of the tubes of the banks connecting the water drum to the steam and water drum and the bank of tubes connecting the mud drum to the steam and water drum being within said passage throughout their entire length, a second passage on each side of the first passage entirely separate from each other and from the first passage, some of the tubes of the bank connecting the water drum to the steam and water drum and the bank connecting the mud drum to the steam and water drum being located within the second passages throughout their entire length, an outlet from each of the second passages, and means for supplying waste heat gases from an independent source to each of said second passages.

4. A boiler comprising a setting, a mud drum, a water drum and a steam and water drum in the setting, a bank of tubes connecting the mud drum to the water drum, a bank of tubes connecting the mud drum to the steam and water drum, a bank of tubes connecting the water drum to the steam and water drum, a combustion chamber for primary fuel in the setting below the bank of tubes connecting the mud drum to the water drum, baffles within the setting forming a circuitous pass for the gases from the combustion chamber to an outlet from the setting, some of the tubes of the banks connecting the water drum to the steam and water drum and the bank of tubes connecting the mud drum to the steam and water drum being within said passage throughout their entire length, a second passage on each side of the first passage entirely separate from each other and from the first passage, some of the tubes of the bank connecting the water drum to the steam and water drum and the bank connecting the mud drum to the steam and water drum being located within the second passages throughout their entire length, an outlet from each of the second passages, means for supplying waste heat gases from an independent source to each of said second passages, and damper means in each of the outlets for controlling the flow of gases.

5. A boiler comprising a setting, drums in the setting, banks of tubes connecting the drums, a combustion chamber for primary fuel in the setting, an outlet from the setting, there being a passage for the products of combustion extending from the combustion chamber to the outlet, some of the tubes of some of said banks throughout their entire length being within said passage, a second passage within the setting separate from the first passage, some of the tubes of some of the banks throughout their entire length being within the second passage, an outlet from the second passage, means for supplying waste heat gases from an independent source to said second passage, an air heating trunk within the setting, there being an air opening from said trunk to the second passage, and means for controlling the admission of air to the air heating trunk.

6. A boiler comprising a setting, a transverse mud drum in the setting, a transverse water drum in the setting, a transverse steam and water drum in the setting, a bank of tubes connecting the mud drum to the water drum, a bank of tubes connecting the water drum to the steam and water drum, a bank of tubes connecting the mud drum to the steam and water drum, baffling means extending from side wall to side wall of the setting, there being a combustion chamber for primary fuel in the setting below the tubes connecting the mud drum to the water drum, said baffling means forming a circuitous path for the products of combustion from the combustion chamber over the various tubes to the last pass in the setting formed by said baffles, an outlet from the last pass, a damper in said pass, a floor portion supported in close relation to the bank of tubes connecting the mud drum to the water drum, a vertically disposed wall within the setting adjacent to each side wall of the setting and extending from the front wall to the rear wall, said walls in combination with the floor and baffling means forming two separate passages for waste heat gases within which some of the tubes of the banks connecting the water drum to the steam and water drum and the mud drum to the steam and water drum are located entirely within said waste gas passages, while other tubes of said last mentioned banks are located throughout their entire length within the passage for the gases from the combustion chamber, there being an outlet from the last passes of the passages for the waste heat gases, and a damper in each of said outlets for controlling the flow of gases through said passages, and means for supplying waste heat gases from an independent source to each of the waste heat gas passes.

Signed at Chicago in the county of Cook and State of Illinois this fifth day of February A. D. 1927.

ELMER S. SMAIL.